United States Patent
Nishi et al.

(10) Patent No.: US 10,904,249 B2
(45) Date of Patent: Jan. 26, 2021

(54) TERMINAL MANAGEMENT APPARATUS, TERMINAL MANAGEMENT SYSTEM, AND NON-TRANSITORY COMPUTER READABLE MEDIUM

(71) Applicant: FUJI XEROX CO., LTD., Tokyo (JP)

(72) Inventors: Eiji Nishi, Kanagawa (JP); Keita Sakakura, Kanagawa (JP); Ryuichi Ishizuka, Tokyo (JP); Yoshihiro Sekine, Kanagawa (JP); Kenji Kuroishi, Kanagawa (JP); Takeshi Furuya, Kanagawa (JP); Hiroshi Mikuriya, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 290 days.

(21) Appl. No.: 15/891,514

(22) Filed: Feb. 8, 2018

(65) Prior Publication Data
US 2018/0278608 A1 Sep. 27, 2018

(30) Foreign Application Priority Data

Mar. 24, 2017 (JP) ................................ 2017-058777

(51) Int. Cl.
*H04L 29/06* (2006.01)
*H04W 12/06* (2009.01)
(Continued)

(52) U.S. Cl.
CPC .......... *H04L 63/0876* (2013.01); *H04L 41/28* (2013.01); *H04L 63/08* (2013.01);
(Continued)

(58) Field of Classification Search
CPC ..... H04L 63/0876; H04L 41/28; H04L 63/08; H04L 63/0823; H04L 63/083; H04W 12/06; H04W 12/12
See application file for complete search history.

(56) References Cited

U.S. PATENT DOCUMENTS 9,923,976 B2 * 3/2018 Kobayashi ............ H04L 67/143
9,942,328 B2 * 4/2018 Holland .............. H04L 63/0823
(Continued)

FOREIGN PATENT DOCUMENTS

JP 2005-040974 A 2/2005
JP 2006-259797 A 9/2006
(Continued)

OTHER PUBLICATIONS

Notice of Reasons for Refusal dated Oct. 20, 2020 from the Japanese Patent Office in Application No. 2017-058777.

*Primary Examiner* — Christopher A Revak
(74) *Attorney, Agent, or Firm* — Sughrue Mion, PLLC

(57) ABSTRACT

A terminal management apparatus includes a connection unit that connects, through a network, to a terminal apparatus to be managed, an authentication unit that authenticates the terminal apparatus using predetermined authentication information, a specific state determination unit that determines whether a predetermined specific state, in which a normal connection is not established, has occurred in relation to the terminal apparatus, and a connection controller that controls data communication with the terminal apparatus on a basis of a result of the authentication performed by the authentication unit and a result of the determination made by the specific state determination unit.

9 Claims, 10 Drawing Sheets

(51) Int. Cl.
*H04W 12/12* (2009.01)
*H04L 12/24* (2006.01)

(52) U.S. Cl.
CPC .......... *H04W 12/06* (2013.01); *H04W 12/12* (2013.01); *H04L 63/083* (2013.01); *H04L 63/0823* (2013.01)

(56) References Cited

U.S. PATENT DOCUMENTS

| | | | |
|---|---|---|---|
| 10,432,265 B2* | 10/2019 | Hamakawa | H04M 1/7253 |
| 2007/0136804 A1* | 6/2007 | Ohsawa | H04L 63/108 |
| | | | 726/14 |
| 2016/0192403 A1* | 6/2016 | Gupta | H04L 63/166 |
| | | | 455/411 |

FOREIGN PATENT DOCUMENTS

| | | |
|---|---|---|
| JP | 2006-270414 A | 10/2006 |
| JP | 2006-331007 A | 12/2006 |

* cited by examiner

TERMINAL MANAGEMENT APPARATUS, TERMINAL MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-058777 filed Mar. 24, 2017.

BACKGROUND

Technical Field

The present invention relates to a terminal management apparatus, a terminal management system, and a non-transitory computer readable medium.

SUMMARY

According to an aspect of the invention, there is provided a terminal management apparatus including a connection unit that connects, through a network, to a terminal apparatus to be managed, an authentication unit that authenticates the terminal apparatus using predetermined authentication information, a specific state determination unit that determines whether a predetermined specific state, in which a normal connection is not established, has occurred in relation to the terminal apparatus, and a connection controller that controls data communication with the terminal apparatus on a basis of a result obtained by the authentication unit and a result obtained by the specific state determination unit.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail hereinafter with reference to the accompanying drawings.

System According to Exemplary Embodiment

Figure 1:
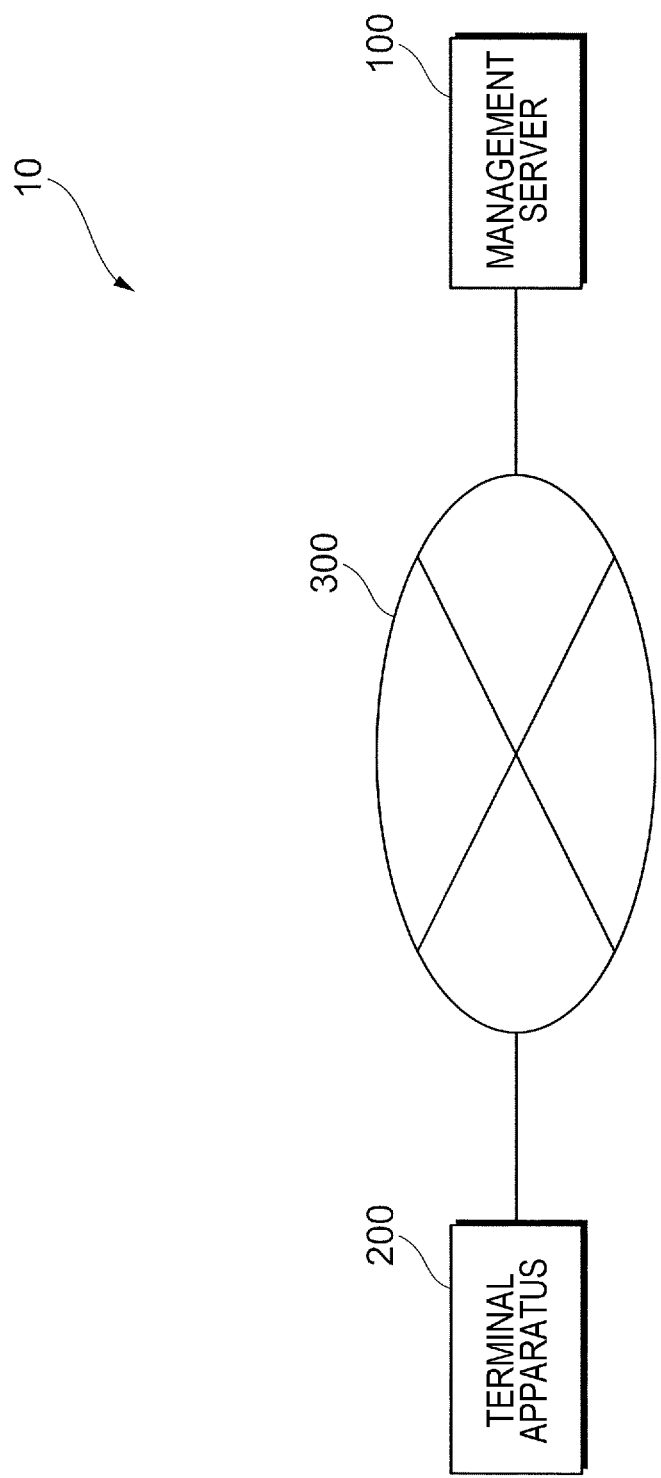
FIG. 1 is a diagram illustrating the overall configuration of a terminal management system according to an exemplary embodiment.

FIG. 1 is a diagram illustrating the overall configuration of a terminal management system according to an exemplary embodiment. A terminal management system 10 illustrated in FIG. 1 includes a management server 100 and a terminal apparatus 200 to be managed. The management server 100 and the terminal apparatus 200 are connected to each other through a network 300. Although not illustrated in FIG. 1, the management server 100 may be connected to another server (external server) through the network 300. In this case, the management server 100 functions as a so-called edge server in an information system including the other server on the network 300.

The management server 100 is an example of a terminal management apparatus that manages the terminal apparatus 200 and achieved, for example, by a personal computer, a server machine, or any other information processing apparatus having a communication function. In the present exemplary embodiment, an example will be described in which an image processing apparatus that is a multifunction machine having a copying function, an image reading function, a printing function, a facsimile function, and a communication function for connecting to the network 300 is used as the management server 100.

The management server 100 manages the terminal apparatus 200, that is, receives information from the terminal apparatuses 200 and transmits control commands to the terminal apparatus 200. The management server 100 includes plural network interfaces for connecting to plural networks. In the example illustrated in FIG. 1, a network adapter for connecting to a local area network (LAN) through wired communication, a Wi-Fi (registered trademark) module as an access point for connecting to the LAN through wireless communication, and a facsimile module for connection through a facsimile communication line (telephone line).

The terminal apparatus 200 is an electronic apparatus having a communication function for performing communication through the network 300. A specific example of the terminal apparatus 200 is a so-called Internet of things (IoT) device. The terminal apparatus 200 includes a sensor as an information obtaining unit, for example, and transmits information obtained by the sensor to the management server 100 through the network 300 using the communication function. The terminal apparatus 200 also includes an operation unit such as an actuator or a light-emitting device and controls the operation unit in accordance with control commands received from the management server 100 through the network 300.

Although it is assumed in the present exemplary embodiment that the management server 100 manages plural terminal apparatuses 200, information obtaining units and operation units of the terminal apparatuses 200 need not be of the same types. The terminal apparatuses 200 may include various information obtaining units and operation units. In addition, each terminal apparatus 200 need not include both an information obtaining unit and an operation unit. Each terminal apparatus 200 may include only either an information obtaining unit or an operation unit. In addition, each terminal apparatus 200 may include plural types of information obtaining units or plural types of operation units. In addition, in the present exemplary embodiment, the terminal apparatuses 200 are installed in various places in accordance with information to be obtained and operations to be performed. Various positional relationships may be established between the management server 100 and the terminal apparatuses 200.

The network 300 is not limited to a particular type, and any communication network used for data communication between the management server 100 and the terminal apparatuses 200, such as a LAN, a wide area network (WAN), or the Internet, may be used. As described above, a communication line used for data communication may be wired or wireless, and may be any type of line. In addition, the apparatuses may be connected to one another through plural networks or plural communication lines.

Configuration of Management Server

Figure 2:
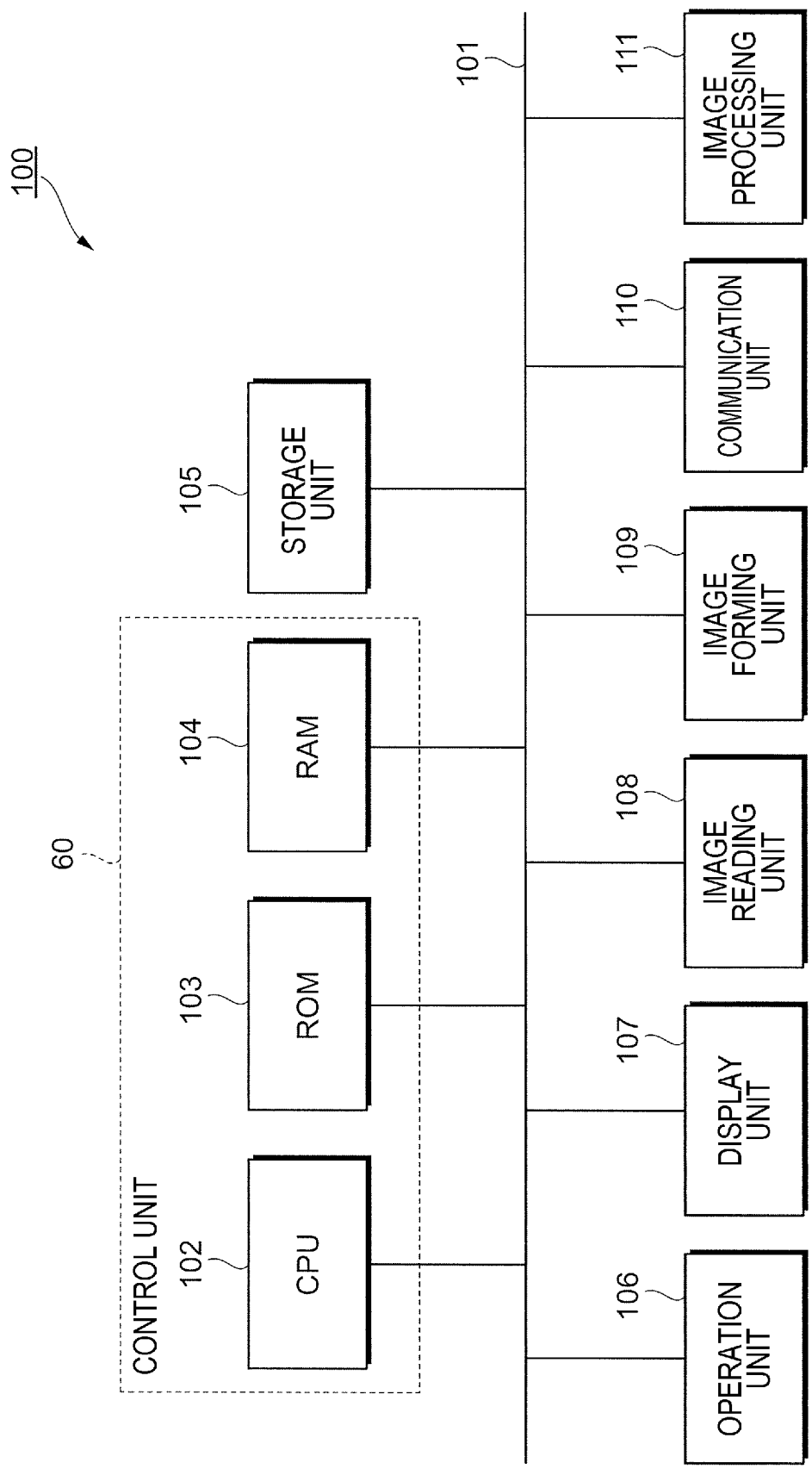
FIG. 2 is a diagram illustrating the functional configuration of a multifunction machine as an example of a management server.

FIG. 2 is a diagram illustrating the functional configuration of the multifunction machine as an example of the management server 100. In the configuration illustrated in FIG. 2, the management server 100 includes a central processing unit (CPU) 102, a read-only memory (ROM) 103, and a random-access memory (RAM) 104 configuring a control unit 60. The management server 100 also includes a storage unit 105, an operation unit 106, a display unit 107, an image reading unit 108, an image forming unit 109, a communication unit 110, and an image processing unit 111. These functional components are connected to a bus 101 and communicate data with one another through the bus 101.

The operation unit 106 receives operations performed by a user. The operation unit 106 is configured, for example, by hardware keys. Alternatively, the operation unit 106 is configured by a touch sensor that outputs a control signal according to a touched position. The operation unit 106 may be configured as a touch panel, instead, which is a combination of a touch sensor and a liquid crystal display configuring the display unit 107, which will be described hereinafter.

The display unit 107 is an example of a display unit and configured, for example, by a liquid crystal display. The display unit 107 displays information relating to the management server 100 under control of the CPU 102. The display unit 107 also displays a menu screen to be referred to by the user when the user operates the management server 100. The operation unit 106 and the display unit 107 together function as a user interface unit of the management server 100.

The image reading unit 108 is configured by a so-called scanner device. The image reading unit 108 optically reads an image on a document set thereon and generates a resultant image (image data). As a method for reading an image, for example, a charge-coupled device (CCD) method in which a light source radiates light onto a document and CCDs receive the light reflected from the document and focused by a lens or a contact image sensor (CIS) method in which light-emitting diodes (LEDs) sequentially radiate light onto a document and a CIS receives reflected light is used.

The image forming unit 109 is an example of an image forming unit and forms an image based on image data using an image forming material on a sheet of paper, which is an example of a recording material. As a method for forming an image on a recording material, for example, an electrophotographic method in which toner applied to a photosensitive member is transferred onto the recording material or an inkjet method in which ink is ejected onto the recording material is used.

The communication unit 110 is a connection unit for connecting to the terminal apparatuses 200 through the network 300 and includes network interfaces according to a type thereof. Although not illustrated, the communication unit 110 includes, as an example of the network interfaces, a network adapter, a Wi-Fi module, and a facsimile module. The communication unit 110 may also include a module (not illustrated) for connecting to the terminal apparatuses 200 through short-distance wireless communication such as near-field communication (NFC) or Bluetooth (registered trademark).

The image processing unit 111 includes a processor, which is a processing unit, and a working memory and performs image processing, such as color correction and tone correction, on an image based on by image data. The CPU 102 of the control unit 60 may function as the processor, and the RAM 104 of the control unit 60 may function as the working memory.

The storage unit 105 is an example of a storage unit and configured, for example, by a storage device such as a hard disk device. The storage unit 105 stores image data, such as resultant images, generated by the image reading unit 108. The storage unit 105 according to the present exemplary embodiment also functions as a terminal information holding unit storing terminal information for connecting the terminal apparatuses 200.

With respect to the CPU 102, the ROM 103, and the RAM 104 configuring the control unit 60, the ROM 103 stores programs to be executed by the CPU 102. The CPU 102 reads one of the programs stored in the ROM 103 and executes the program using the RAM 104 as a working area. Alternatively, a program stored in the storage unit 105 may be loaded into the RAM 104, and the CPU 102 may execute the program loaded into the RAM 104. By executing the programs using the CPU 102, the above-described functional units of the management server 100 are controlled and functions described later are achieved.

The programs to be executed by the CPU 102 can be stored in a computer readable recording medium, such as a magnetic recording medium (a magnetic disk, etc.), an optical recording medium (an optical disc, etc.), or a semiconductor memory, and provided for an image forming apparatus. The programs to be executed by the CPU 102 may be provided for an image forming apparatus through a network such as the Internet.

Functional Configuration of Control Unit

Figure 3:
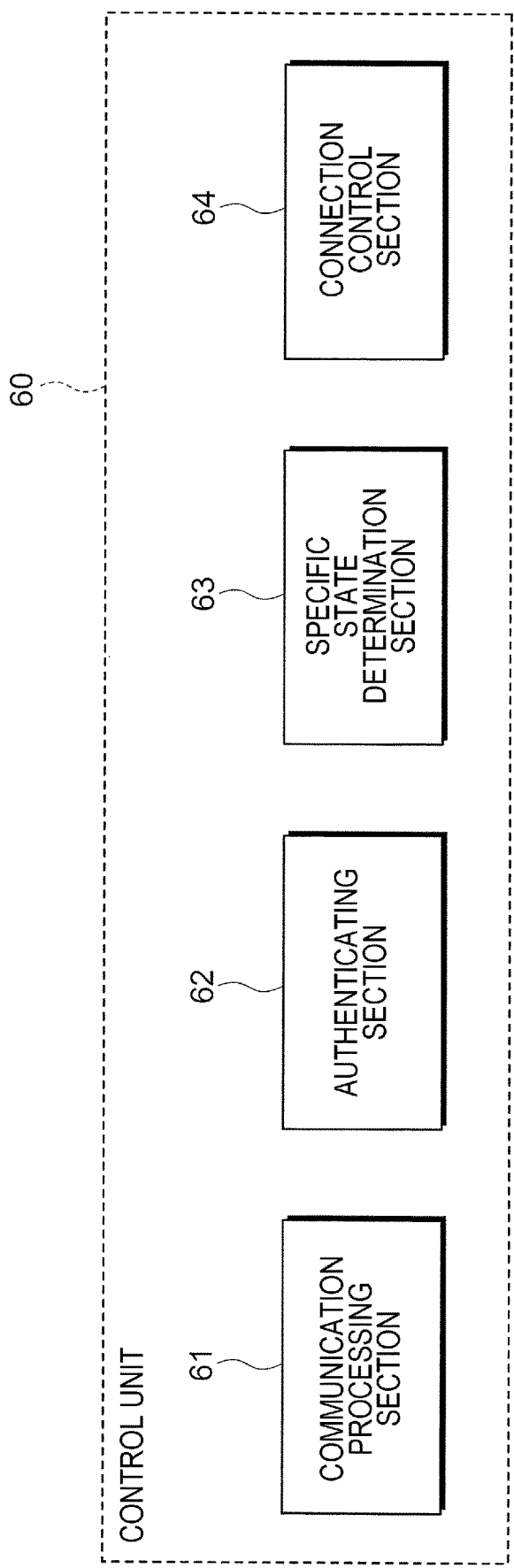
FIG. 3 is a diagram illustrating the functional configuration of a control unit.

FIG. 3 is a diagram illustrating the functional configuration of the control unit 60. Software and hardware resources operate together in the control unit 60, and, as illustrated in FIG. 3, functions of a communication processing section 61, an authentication section 62, a specific state determination section 63, and a connection control section 64 are achieved.

After a connection with a terminal apparatus 200 is established as a result of processing performed by the authentication section 62 and the connection control section 64, which will be described later, the communication processing section 61 communicates data with the terminal apparatus 200. The communication processing section 61 also saves, to the storage unit 105, a connection history including information regarding the connection (identification information regarding the terminal apparatus 200, connection time, etc.).

The authentication section 62 performs a process for authenticating a terminal apparatus 200 connected to the management server 100 through the network 300. The authentication section 62 performs the authentication process using predetermined authentication information. The authentication information is stored, for example, in the storage unit 105. As the authentication information, for example, identifiers (IDs; also called "identification information") and passwords of the terminal apparatus 200 and a user of the terminal apparatus 200 are used. A user name, for example, may be used as the ID. A personal identification number (PIN) code may be used as the password. Authentication employing a digital certificate may be performed, instead. The management server 100 may issue an authentication token to the terminal apparatus 200 after a first authentication process is successfully completed, and second and later authentication processes may be skipped using the authentication token. The present exemplary embodiment does not limit a type of authentication information and an authentication method. Any known authentication technique may be used.

The specific state determination section 63 determines, on the basis of a connection history in relation to a terminal apparatus 200, whether a predetermined specific state, in which a normal connection is not established, has occurred with the terminal apparatus 200. The specific state in which a normal connection is not established occurs when, for example, the management server 100 and the terminal apparatus 200 have remained disconnected from each other for a predetermined period of time and then a connection has been established again. When a connection mode in which a connection is established on the basis of a communication request from the terminal apparatus 200 is employed, for example, the specific state occurs when the terminal apparatus 200 has not transmitted a communication request for a certain period of time and then begun to transmit a communication request again. When a communication mode in which a connection is established on the basis of a response, from the terminal apparatus 200, to a communication request issued by the management server 100 is employed, the specific state occurs when the terminal apparatus 200 has not responded to a communication request issued by the management server 100 for a certain period of time and then begun to respond to a communication request again. Details of an operation performed when the specific state has occurred will be described later.

The connection control section 64 performs connection control on a terminal apparatus 200 with which it has been determined by the specific state determination section 63 that the specific state has occurred. More specifically, the connection control section 64 does not permit the terminal apparatus 200 to the management server 100 until a predetermined condition is satisfied. A type of connection control is individually determined in accordance with specific specifications of the terminal management system 10 or the like. For example, the connection control section 64 may prohibit a terminal apparatus 200 that has refused a connection from reconnecting to the management server 100. Alternatively, the connection control section 64 may permit the terminal apparatus 200 to reconnect to the management server 100 after a predetermined period of time elapses. Alternatively, the connection control section 64 may permit the terminal apparatus 200 to reconnect to the management server 100 if a predetermined specific procedure, along with the authentication process, is completed successfully. Alternatively, the connection control section 64 may permit the terminal apparatus 200 to reconnect to the management server 100 after authentication information is set again.

If the specific state occurs in the present exemplary embodiment, a terminal apparatus 200 is regarded as having been temporarily removed from the terminal management system 10. In addition, since IoT devices are used as the terminal apparatuses 200 in the present exemplary embodiment, a terminal apparatus 200 that has been removed from the terminal management system 10 is basically regarded as having been illegitimately removed. The connection control section 64 then prohibits the terminal apparatus 200 from reconnecting to the terminal management system 10 (management server 100) as described above. A power supply of a terminal apparatus 200 or the management server 100, however, might be turned off or a connection to the network 300 might be broken due to maintenance work or the like. Such a state occurs, for example, when a battery of a terminal apparatus 200 has run out, when a terminal apparatus 200 has been turned off due to legitimate maintenance work or the like, or when the management server 100 has been turned off due to legitimate maintenance work or the like. Specific conditions, therefore, are determined, and if one of these specific conditions is satisfied, a terminal apparatus 200 is regarded as not having been illegitimately removed, and is not subjected to the connection prohibition performed by the connection control section 64. The specific conditions will be described hereinafter.

Example of Specific Conditions for Disabling Connection Prohibition Performed by Connection Control Section First, an operation performed when the specific state has occurred due to a depleted battery of a terminal apparatus 200 will be described. In this case, a battery charging state can be detected, for example, by measuring voltage. A measuring unit that measures operating voltage, for example, is provided for the terminal apparatus 200, and the measuring unit regularly transmits data regarding measured voltage to the management server 100. If determining on the basis of the received data regarding measured voltage that the specific state, in which a normal connection is not established, has occurred after a certain period of time for which voltage remained low, the management server 100 disables the connection prohibition performed by the connection control section 64 while assuming that the connection has been broken due to a depleted battery of the terminal apparatus 200. Alternatively, the measuring unit need not be provided for the terminal apparatus 200. In this case, the management server 100 measures the intensity of radio waves transmitted from the terminal apparatus 200. If the specific state, in which a normal connection is not established, has occurred after a certain period of time for which radio waves remained weak or intermittent, the management server 100 may disable the connection prohibition performed by the connection control section 64 while assuming that the connection has been broken due to a depleted battery of the terminal apparatus 200.

Next, an operation performed when the specific state has occurred because a terminal apparatus 200 was turned off due to legitimate maintenance work or the like will be described. In this case, a person who turns off the terminal apparatus 200 is obliged to perform a certain operation. If the certain operation is performed, the terminal apparatus 200 notifies the management server 100 that the certain operation has been performed, for example, by transmitting a special code to the management server 100. As a result, the management server 100 learns that the terminal apparatus 200 has been intentionally turned off for legitimate purposes. In this case, the connection prohibition performed by the connection control section 64 is disabled even if the specific state, in which a normal connection is not established, occurs.

Next, an operation performed when the specific state has occurred because the management server 100 was turned off due to legitimate maintenance work or the like will be described. In this case, the management server 100 and a terminal apparatus 200 are disconnected from each other simply because the management server 100 is turned off.

The connection prohibition performed by the connection control section 64, therefore, may be disabled even if the specific state, in which a normal connection is not established, occurs while the management server 100 is off. In addition, if a substitute apparatus (not illustrated) of the management server 100 can be prepared, the substitute apparatus may communicate with the terminal apparatus 200. After the management server 100 is turned on again, the management server 100 may receive a communication history from the substitute apparatus. In doing so, the specific state, in which a normal connection is not established, does not occur, and the connection control section 64 does not perform the connection prohibition.

Example of Specific Procedure for Lifting Connection Prohibition Performed by Connection Control Section As described above, if the authentication process and the predetermined specific procedure are successfully completed after the connection control section 64 performs the connection prohibition, a terminal apparatus 200 is permitted to reconnect to the management server 100. An example of the specific procedure will be described.

In an example of the specific procedure, each terminal apparatus 200 is checked using plural pieces of information unique to the terminal apparatus 200 other than the authentication information. The information unique to each terminal apparatus 200 (unique information) may include, for example, a media access control (MAC) address, a serial number of the product, and various pieces of setting information. In addition, specific data for checking each terminal apparatus 200 may be stored in the memory and used as the information unique to the terminal apparatus 200. In addition, firmware data (program) for operating each terminal apparatus 200 or a firmware checksum may be used as the information unique to the terminal apparatus 200. In the specific procedure, these pieces of information are stored in the storage unit 105 of the management server 100, and the connection control section 64 compares these pieces of information with information obtained from a terminal apparatus 200 with which the specific state determination section 63 has determined that the specific state has occurred.

In the present exemplary embodiment, the connection control section 64 checks each terminal apparatus 200 using the plural pieces of information unique to the terminal apparatus 200 in order to determine whether a terminal apparatus 200 that has been authenticated on the basis of the authentication information has not been changed at all from the terminal apparatus 200 before the specific state occurred. In addition, if the setting information is initialized or firmware is updated for legitimate purposes, a state of a terminal apparatus 200 becomes different from that of the terminal apparatus 200 before the specific state occurred. In this case, the connection control section 64 can confirm that the terminal apparatus 200 is identical with the terminal apparatus 200 before the specific state occurred, for example, by giving priority to information that is not initialized or updated, such as the MAC address, or notifying, in advance, the management server 100 of information changed as a result of initialization or updating.

Configuration of Terminal Apparatus

Figure 4:
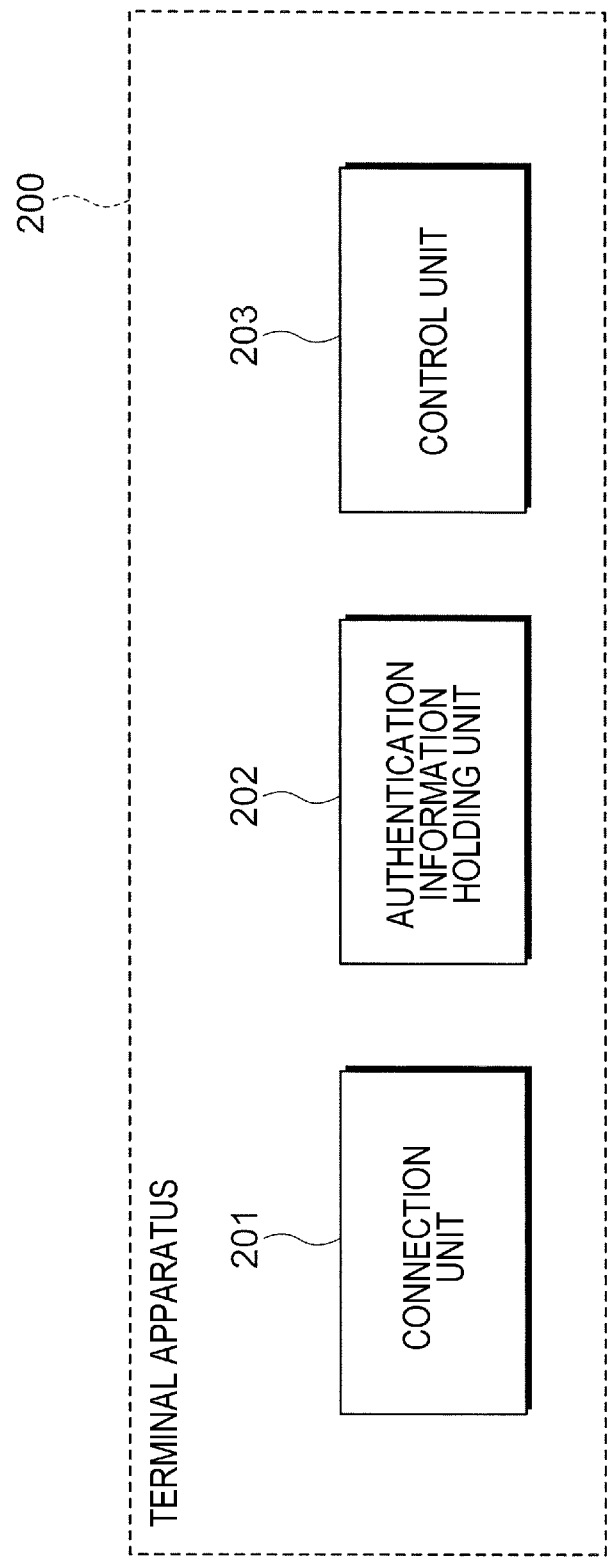
FIG. 4 is a diagram illustrating the functional configuration of a terminal apparatus.

FIG. 4 is a diagram illustrating the functional configuration of each terminal apparatus 200. As illustrated in FIG. 4, the terminal apparatus 200 includes a connection unit 201, an authentication information holding unit 202, and a control unit 203. The connection unit 201 includes a network interface for connecting to the management server 100 through the network 300. The authentication information holding unit 202 is achieved by a storage device such as a semiconductor memory or a magnetic disk and holds the authentication information used for the authentication process for connecting to the management server 100. The control unit 203 controls functions of the terminal apparatus 200. For example, the control unit 203 obtains information from the sensor and transmits the information to the management server 100 or controls the operation unit such as an actuator on the basis of a command received from the management server 100. In addition, when performing communication between the terminal apparatus 200 and the management server 100, the control unit 203 reads the authentication information necessary for the authentication process from the authentication information holding unit 202 and transmits the authentication information to the management server 100. Furthermore, if the management server 100 checks the terminal apparatus 200 using the information unique to the terminal apparatus 200 in the above-described specific procedure, the control unit 203 transmits information to be used in the check to the management server 100.

Operation of Management Server

Figure 5:
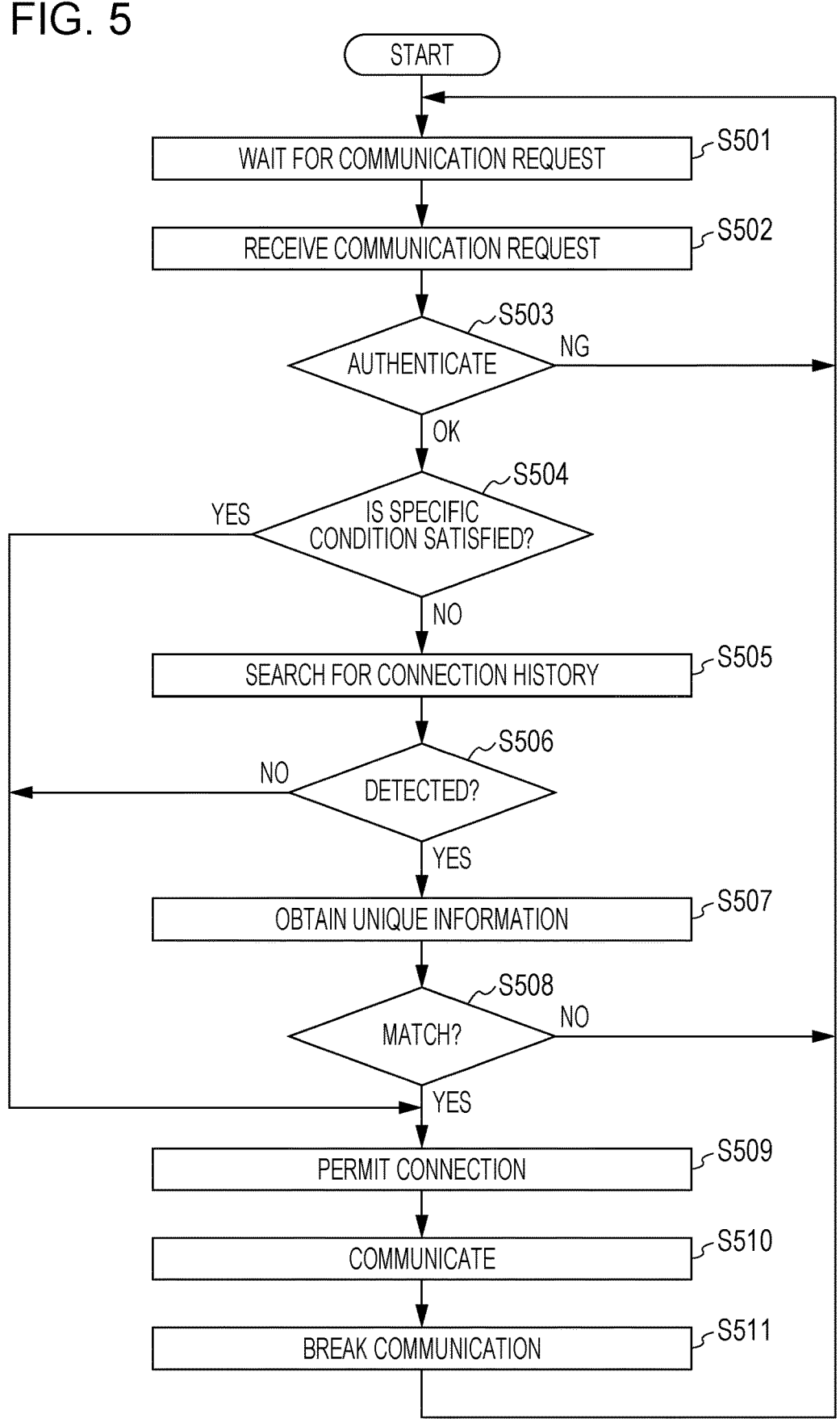
FIG. 5 is a flowchart illustrating an operation performed by the management server when the management server and the terminal apparatus are connected to each other.

FIG. 5 is a flowchart illustrating an operation performed by the management server 100 when the management server 100 and a terminal apparatus 200 are connected to each other. Here, the terminal apparatus 200 issues a communication request to connect to the management server 100. As illustrated in FIG. 5, in an initial state, the management server 100 waits for a communication request from the terminal apparatus 200 (S501). The management server 100 then receives a communication request from the terminal apparatus 200 (hereinafter referred to as a "terminal apparatus A") (S502), and the authentication section 62 of the management server 100 receives authentication information regarding the terminal apparatus A and performs the authentication process (S503). If the authentication section 62 does not successfully authenticate the terminal apparatus 200 (NG in S503), the management server 100 ends the process and waits for a next communication request from a terminal apparatus 200 (S501).

If the authentication section 62 successfully authenticates the terminal apparatus 200 (OK in S503), the connection control section 64 of the management server 100 determines whether one of the specific conditions, which indicate that the terminal apparatus A has been removed from the terminal management system 10 for legitimate purposes and reconnected to the management server 100, is satisfied (S504). If the terminal apparatus A satisfies one of the specific conditions (YES in S504), the connection control section 64 permits the terminal apparatus A to connect to the management server 100 (S509), and the communication processing section 61 communicates with the terminal apparatus A (S510). After the communication of data in this communication process ends, the communication processing section 61 breaks the communication with the terminal apparatus A (S511). The communication processing section 61 then saves a connection history regarding the communication to the storage unit 105 and waits for a next communication request from a terminal apparatus 200 (S501).

If the terminal apparatus A does not satisfy one of the specific conditions (NO in S504), the connection control section 64 searches connection histories with the terminal apparatuses 200 held by the storage unit 105 for a connection history in relation to the terminal apparatus A (S505). If no connection history is detected in relation to the terminal apparatus A (NO in S506), this means that the terminal apparatus A is connecting to the management server 100 for a first time, and the connection control section 64 permits the terminal apparatus A to connect to the management server 100 (S509). This is because when the terminal apparatus A is connecting to the management server 100 for the first time, it is not possible that the terminal apparatus A has been removed from the terminal management system 10 and reconnected to the management server 100. After the connection control section 64 successfully authenticates the terminal apparatus A, the communication processing section 61 communicates with the terminal apparatus A (S510). After the communication of data in the communication process ends, the communication processing section 61 breaks the communication with the terminal apparatus A (S511). The communication processing section 61 then saves a connection history regarding the communication to the storage unit 105 and waits for a next communication request from a terminal apparatus 200 (S501).

If a connection history in relation to the terminal apparatus A is detected (YES in S506), on the other hand, the connection control section 64 obtains information unique to the terminal apparatus A used for a check from the terminal apparatus A (S507). If the obtained information matches information unique to the terminal apparatus A recorded in the connection history (YES in S508), the connection control section 64 permits the terminal apparatus A to connect to the management server 100 (S509), and the communication processing section 61 communicates with the terminal apparatus A (S510). After the communication of data in the communication process ends, the communication processing section 61 breaks the communication with the terminal apparatus A (S511). The communication processing section 61 then saves a connection history regarding the communication to the storage unit 105 and waits for a next communication request from a terminal apparatus 200 (S501).

If the information obtained from the terminal apparatus A does not match the information unique to the terminal apparatus A recorded in the connection history (NO in S508), the connection control section 64 does not permit the terminal apparatus A to connect to the management server 100. The management server 100 then ends the process and waits for a next communication request from a terminal apparatus 200 (S501).

In the above example of the operation, whether one of the specific conditions, which indicate that the terminal apparatus A has been removed from the terminal management system 10 and reconnected to the management server 100 for legitimate purposes, is satisfied is determined immediately after the authentication process performed by the authentication section 62 (refer to S504). Alternatively, first, the specific state determination section 63 may determine whether the terminal apparatus A has been temporarily removed from the terminal management system 10 and reconnected to the management server 100 and, if so, determine whether one of the specific conditions, which indicate that the operation has been performed for legitimate purposes, is satisfied. Similarly, the steps of the above example of the operation may be subjected to modification, addition, or omission insofar as the technical scope of the present invention is not deviated from. The operation of the management server 100 according to the present exemplary embodiment is not limited to that illustrated in FIG. 5.

Another Embodiment

In the above exemplary embodiment, whether a terminal apparatus 200 has been temporarily removed from the terminal management system 10 and reconnected to the management server 100, and whether the operation has been performed for legitimate purposes, are determined on the basis of information such as a connection history in relation to the terminal apparatus 200 stored in the management server 100. Alternatively, if a terminal apparatus 200 is removed from the terminal management system 10 and connected to another network, information regarding the illegitimate connection may be generated. The configuration and operation of the terminal apparatus 200 and the operation of the management server 100 in this case will be described hereinafter.

Figure 6:
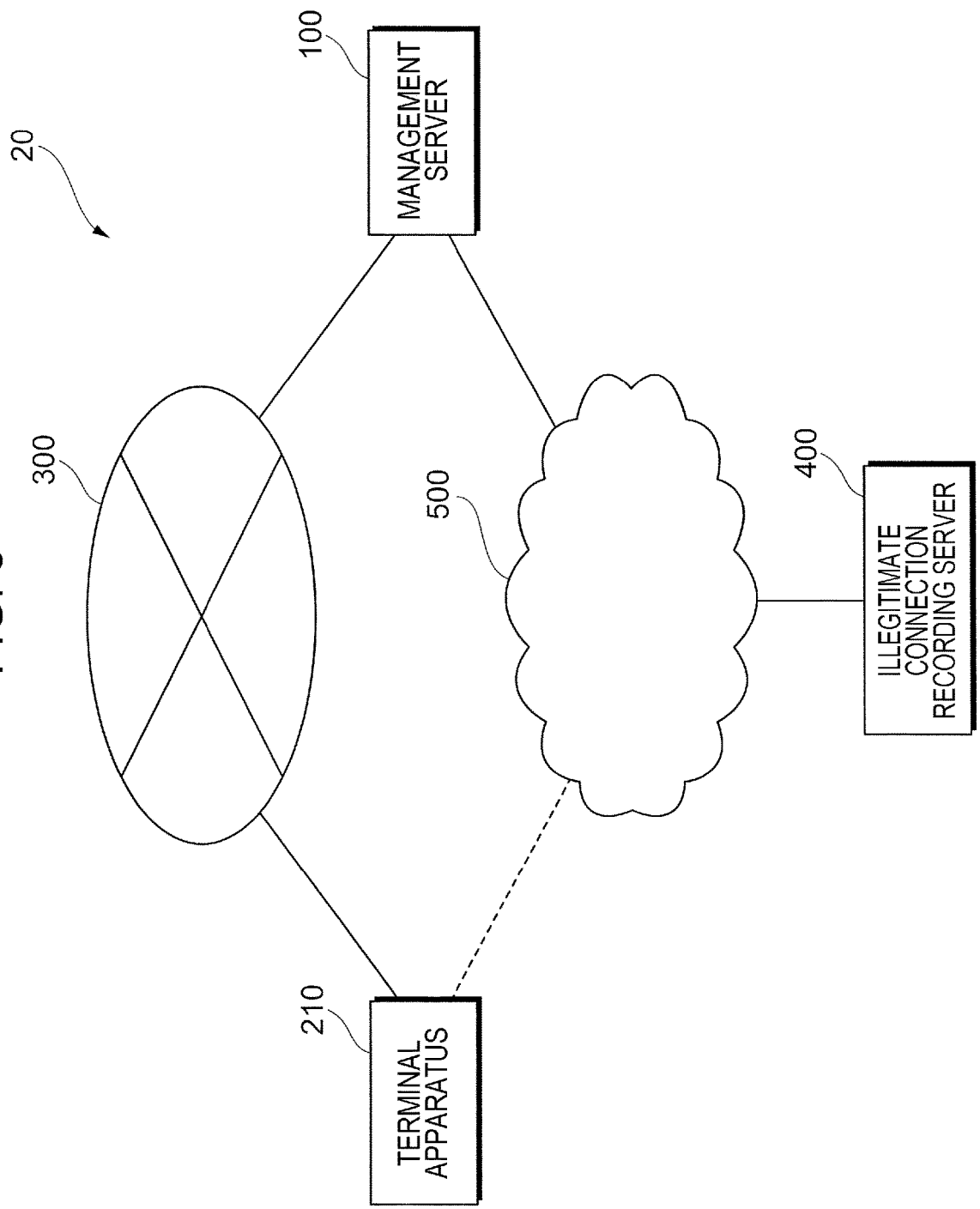
FIG. 6 is a diagram illustrating the overall configuration of a terminal management system according to another exemplary embodiment.

FIG. 6 is a diagram illustrating the overall configuration of a terminal management system according to another exemplary embodiment. A terminal management system 20 illustrated in FIG. 6 includes the management server 100, a terminal apparatus 210, and an illegitimate connection recording server 400. The management server 100 and the terminal apparatus 210 are connected to each other through the network 300. As in the configuration illustrated in FIG. 1, the management server 100 may be connected to another server (external server) on the network 300 and function as a so-called edge server. In the configuration illustrated in FIG. 6, the management server 100 is connected to the illegitimate connection recording server 400 through an Internet 500.

The illegitimate connection recording server 400 is connected to the Internet 500, not to the network 300. In the terminal management system 10 illustrated in FIG. 1, the Internet may be used as the network 300, but because a network used to connect to the illegitimate connection recording server 400 is not managed by the management server 100, the Internet 500 is illustrated separately from the network 300. If the terminal apparatus 210 is separated from the management server 100 and connected to the Internet 500, the terminal apparatus 210 is connected to the illegitimate connection recording server 400.

Figure 7:
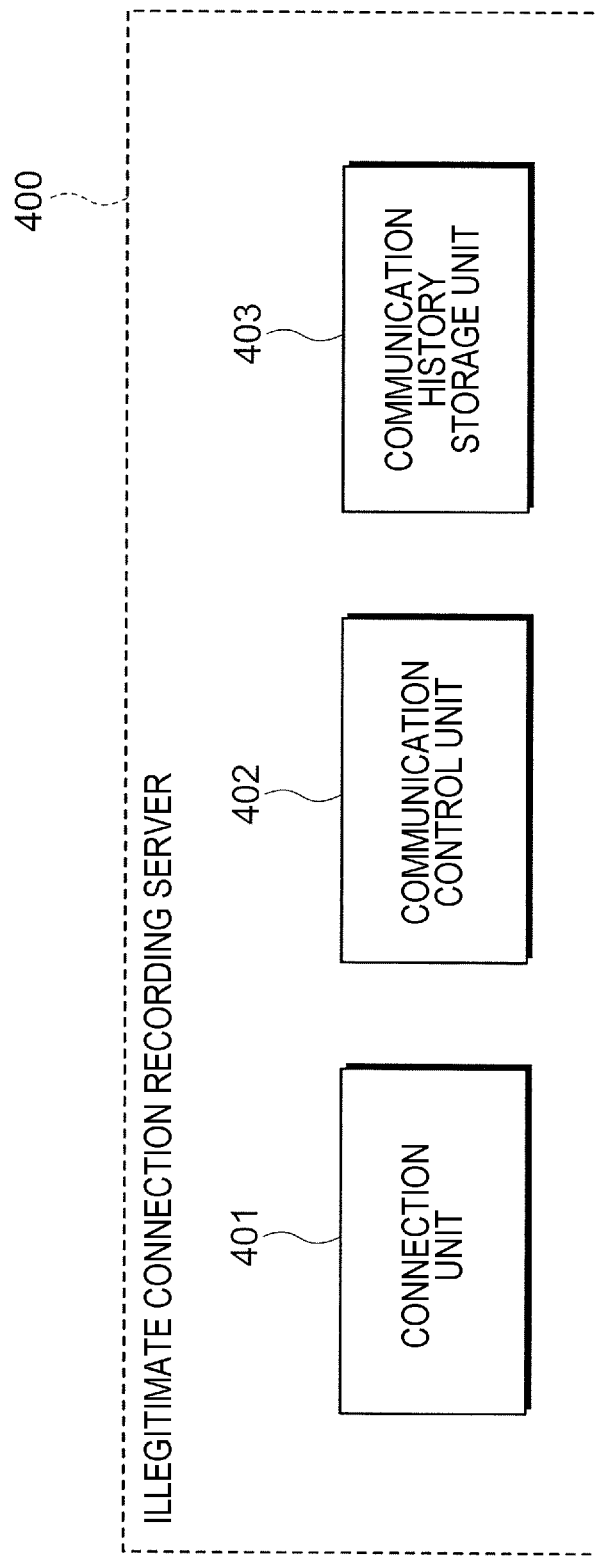
FIG. 7 is a diagram illustrating the functional configuration of an illegitimate connection recording server.

FIG. 7 is a diagram illustrating the functional configuration of the illegitimate connection recording server 400. As illustrated in FIG. 7, the illegitimate connection recording server 400 includes a connection unit 401 including a network interface for connecting to the Internet 500, a communication control unit 402 for communicating with the management server 100 and the terminal apparatus 210 through the Internet 500, and a communication history storage unit 403 that saves communication histories in relation to the terminal apparatus 210.

Figure 8:
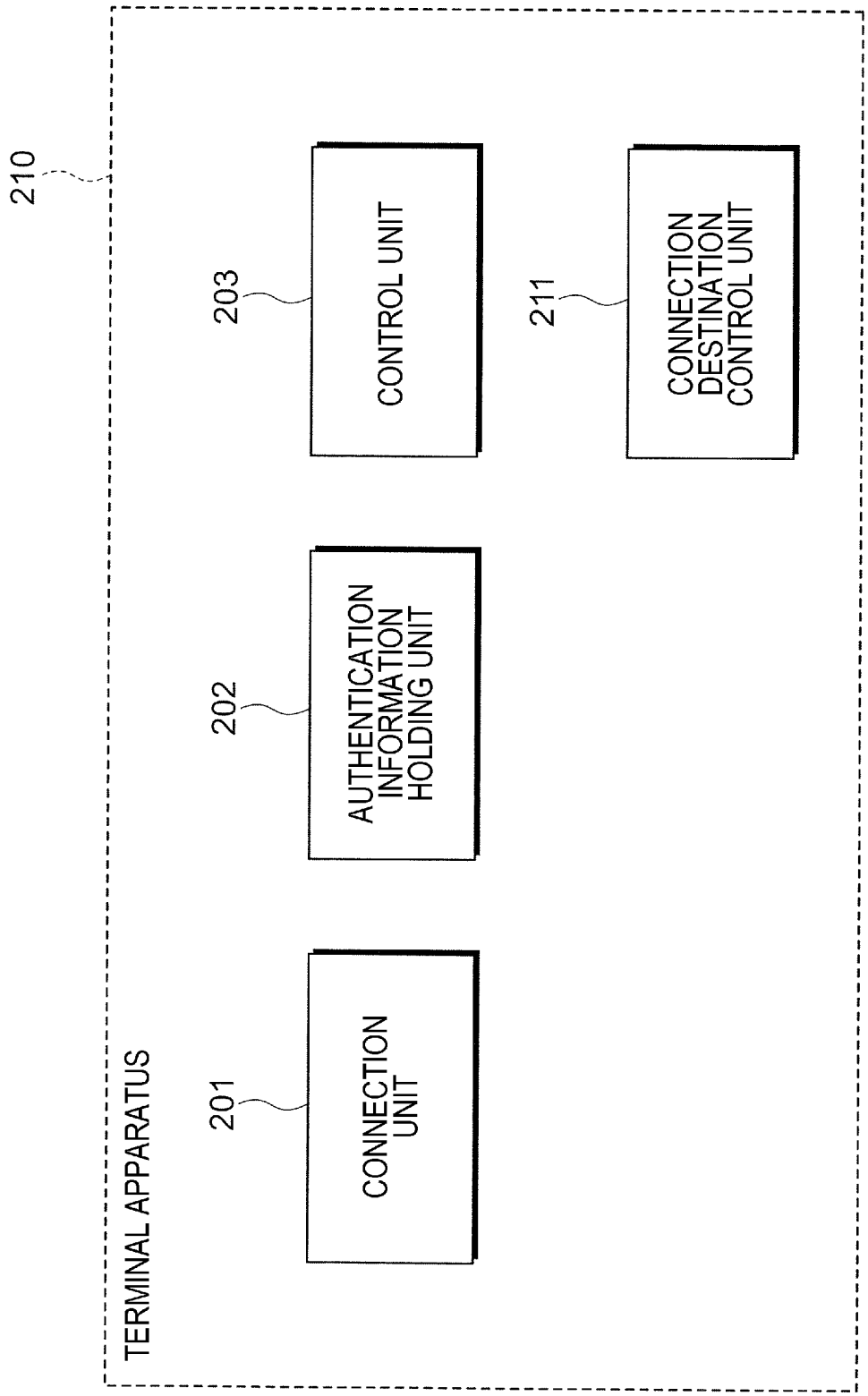
FIG. 8 is a diagram illustrating the functional configuration of a terminal apparatus.

FIG. 8 is a diagram illustrating the functional configuration of the terminal apparatus 210. In the terminal apparatus 210 illustrated in FIG. 8, a connection unit 201, an authentication information holding unit 202, and a control unit 203 are the same as the corresponding components of the terminal apparatus 200 illustrated in FIG. 4, and description thereof is omitted by giving these components the same reference numerals as those given to the corresponding components. After the connection unit 201 is connected to a network (the network 300 or the Internet 500), a connection destination control unit 211 searches for a server to connect to. More specifically, the connection destination control unit 211 searches for the management server 100 first and, if it is difficult to connect to the management server 100, searches for and connects to the illegitimate connection recording server 400. The connection destination control unit 211 searches for the management server 100 and the illegitimate connection recording server 400, for example, by changing an address (Internet protocol (IP) address) of a connection destination in IP communication.

Switching of the connection destination performed by the connection destination control unit 211 will be further described hereinafter. If the terminal apparatus 210 is connected not to the network 300 but to the Internet 500, the connection destination control unit 211 learns that the terminal apparatus 210 is not connected to the management server 100, and needs to switch the connection destination from the management server 100 to the illegitimate connection recording server 400. In order to achieve the switching, the connection destination control unit 211 recognizes that the terminal apparatus 210 has been connected to the Internet 500 in a connection environment different from an original connection destination managed by the management server 100.

In an example of a method for recognizing that the connection environment is different from the original connection environment, a failed communication request to the management server 100 may be used. That is, since the management server 100 does not receive a communication request from the terminal apparatus 210 unless the network 300 is used, a communication request to the management server 100 issued by the terminal apparatus 210 fails due to timeout. The connection destination control unit 211, therefore, recognizes that the connection environment is different from the original connection environment if a communication request has failed a certain number of times in a row, for example, and switches the connection destination to the illegitimate connection recording server 400.

In another example of the method for recognizing that the connection environment is different from the original connection environment, a network to which the terminal apparatus 210 is connected may be searched for the management server 100 by transmitting a ping code, and if the management server 100 is not detected, the connection destination control unit 211 may recognize that the connection environment is different from the original connection environment and switch the connection destination to the illegitimate connection recording server 400.

In yet another example of the method for recognizing that the connection environment is different from the original connection environment, the connection environment may be identified on the basis of a network address obtained from a dynamic host configuration protocol (DHCP) server if the network 300 is in an IP network environment in which the DHCP server is used. That is, a network address when the terminal apparatus 210 is connected to the management server 100 may be stored in a storage device, and if a network address obtained from the DHCP server (IPv4) (a network prefix in the case of IPv6 (DHCPv6)) in a current connection is different from the network address held by the storage device, the connection destination control unit 211 may recognize that the connection environment is different from the original connection environment and switch the connection destination to the illegitimate connection recording server 400.

Although the connection target control unit 211 recognizes that the connection environment is different from the original connection environment and switches the connection destination in the above examples, the connection target control unit 211 may detect a change in a physical position (installation position) of the terminal apparatus 210 (that is, the terminal apparatus 210 has been moved from an original installation position), and switch the connection destination, instead. In this case, the terminal apparatus 210 may be provided with a function of measuring a position based on a global positioning system (GPS) and learn, on the basis of information obtained using the function, that the terminal apparatus 210 has been physically moved.

Figure 9:
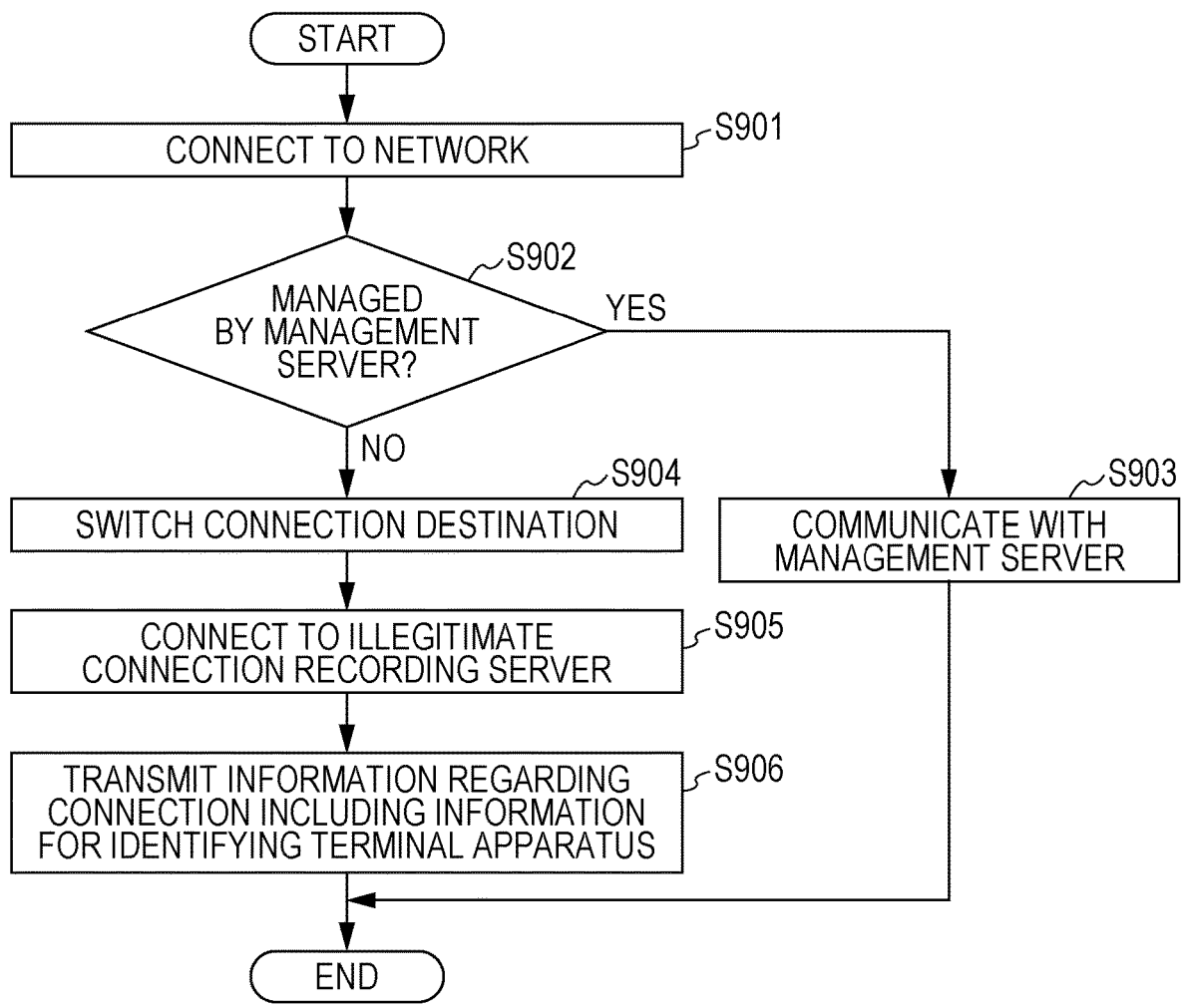
FIG. 9 is a flowchart illustrating an operation performed by the terminal apparatus when the terminal apparatus is connected to a network.

FIG. 9 is a flowchart illustrating an operation performed by the terminal apparatus 210 when the terminal apparatus 210 is connected to a network. As illustrated in FIG. 9, after the connection unit 201 of the terminal apparatus 210 connects to a network (S901), the connection destination control unit 211 determines, using one of the above recognition methods, whether a connection environment is the network 300 managed by the management server 100 (S902). If the connection environment is the network 300 managed by the management server 100 (YES in S902), the connection environment has not been changed. The control unit 203, therefore, issues a communication request to the management server 100 and then starts communication after the authentication process (S903).

If the connection environment is not the network 300 managed by the management server 100 (NO in S902), on the other hand, the connection destination control unit 211 switches a connection destination from the management server 100 to the illegitimate connection recording server 400 (S904). The connection destination control unit 211 issues a transmission request to the illegitimate connection recording server 400 to connect to the illegitimate connection recording server 400 (S905) and transmits information for identifying the terminal apparatus 210 to the illegitimate connection recording server 400 (S906). The information for identifying the terminal apparatus 210 is, for example, authentication information or a source IP address used to connect to the management server 100. The information is saved to the illegitimate connection recording server 400 along with information regarding the connection, such as a connection time.

Figure 10:
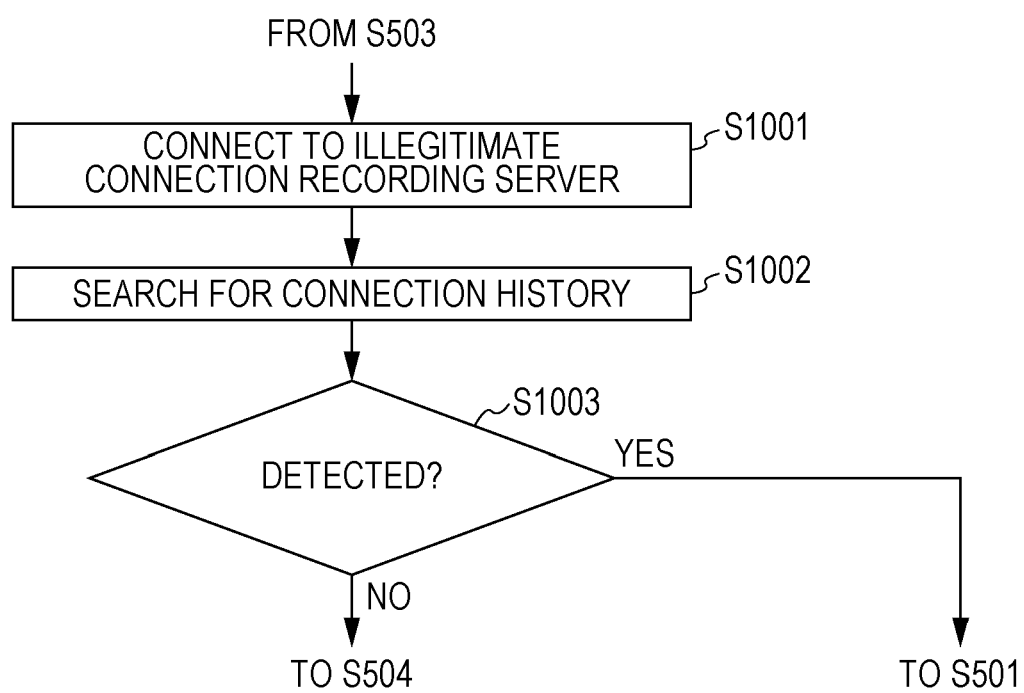
FIG. 10 is a flowchart illustrating the operation of a management server in the terminal management system.

FIG. 10 is a flowchart illustrating the operation of the management server 100 in the terminal management system 20. FIG. 10 illustrates an operation performed after the authentication section 62 performs the authentication process in S503 illustrated in FIG. 5. It is assumed here that the terminal apparatus A described with reference to FIG. 5 has issued a communication request.

As illustrated in FIG. 10, after the authentication section 62 completes the authentication process, the connection control section 64 connects to the illegitimate connection recording server 400 through the Internet 500 (S1001). The connection control section 64 then searches for a connection history in relation to the terminal apparatus A using authentication information used for the authentication process performed by the authentication section 62 (S1002). If a connection history in relation to the terminal apparatus A is detected (YES in S1003), this means that the terminal apparatus has been removed from the terminal management system 20 and connected to the Internet 500. The connection control section 64, therefore, does not authenticate the connection from the terminal apparatus A. The management server 100 ends the process and waits for a next communication request from a terminal apparatus 200 (S501 in FIG. 5).

If a connection history in relation to the terminal apparatus A is not detected (NO in S1003), the connection control section 64 determines whether one of the specific conditions described with reference to S504 illustrated in FIG. 5, which indicate that the terminal apparatus A has been removed from the terminal management system 20 for legitimate purposes and reconnected to the management server 100, is satisfied.

According to the present exemplary embodiment, if the terminal apparatus 210 is removed from the terminal management system 20 and connected to another network, information regarding the illegitimate connection can be obtained. As a result, an illegitimate operation performed on the terminal apparatus 210 can be detected more directly.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal management apparatus comprising:
   a connection unit configured to connect, through a network, to a terminal apparatus to be managed;
   an authentication unit configured to authenticate the terminal apparatus using predetermined authentication information;
   a specific state determination unit configured to determine whether a predetermined specific state, in which a normal connection between the terminal management apparatus and the terminal apparatus is not established, has occurred in relation to the terminal apparatus; and
   a connection controller configured to control data communication with the terminal apparatus using a result obtained by the authentication unit and a result obtained by the specific state determination unit.

2. The terminal management apparatus according to claim 1, wherein the terminal apparatus is one of a plurality of terminal apparatuses, and
   wherein the connection controller is configured to, if the specific state determination unit determines that the specific state has occurred in relation to a specific terminal apparatus among the plurality of terminal apparatuses, then limit the data communication with the specific terminal apparatus.

3. The terminal management apparatus according to claim 1, wherein the terminal apparatus is one of a plurality of terminal apparatuses,
   wherein the connection controller is configured to, if the specific state determination unit determines that the specific state has occurred in relation to a specific terminal apparatus among the plurality of terminal apparatuses after a certain period of time during which operating voltage of the terminal apparatus remained low, then not limit the data communication with the specific terminal apparatus, and
   wherein the connection controller is configured to, if the specific state determination unit determines that the specific state has occurred without the certain period of time during which the operating voltage of the terminal apparatus remained low, then limit the data communication with the specific terminal apparatus.

4. The terminal management apparatus according to claim 1, wherein the terminal apparatus is one of a plurality of terminal apparatuses,
   wherein the connection controller is configured to, if the specific state determination unit determines that the specific state has occurred in relation to a specific terminal apparatus among the plurality of terminal apparatuses after a certain period of time during which intensity of radio waves transmitted from the terminal apparatus remained low, then not limit the data communication with the specific terminal apparatus, and
   wherein the connection controller is configured to, if the specific state determination unit determines that the specific state has occurred without the certain period of time during which the intensity of radio waves transmitted from the specific terminal apparatus remained low, then limit the data communication with the specific terminal apparatus.

5. The terminal management apparatus according to claim 1, wherein the terminal apparatus is one of a plurality of terminal apparatuses,
   wherein the connection controller is configured to, if the specific state determination unit determines that the specific state has occurred in relation to the specific terminal apparatus among the plurality of terminal apparatuses after a predetermined specific operation was performed, then not limit the data communication with the specific terminal apparatus, and
   wherein the connection controller is configured to, if the specific state determination unit determines that the specific state has occurred without the specific operation performed, then limit the data communication with the specific terminal apparatus.

6. The terminal management apparatus according to claim 1, further comprising:
   a terminal information holding unit that holds a plurality of pieces of information,
   wherein the terminal apparatus is one of a plurality of terminal apparatuses, and the plurality of pieces of information are respectively unique to the plurality of terminal apparatuses, and
   wherein the connection controller is configured to, if at least one of the plurality of pieces of information held by the terminal information holding unit is different from information obtained from one terminal apparatus among the plurality of terminal apparatuses which corresponds to the at least one of the plurality of pieces of information, then limit the data communication with the one terminal apparatus.

7. The terminal management apparatus according to claim 1, wherein the connection controller is configured to, if the specific state determination unit determines that the specific state has occurred in the terminal apparatus, and determines that no condition indicating that the terminal apparatus has been legitimately removed from the network has been satisfied, then limit the data communication with the terminal apparatus, and
   wherein the connection controller is configured to, if the specific state determination unit determines that the specific state has occurred in the terminal apparatus, and a condition indicating that the terminal apparatus has been legitimately removed from the network has been satisfied, then refrain from limiting the data communication with the terminal apparatus.

8. A non-transitory computer readable medium storing a program which, if executed, causes a computer to execute a process, the computer being connected through a network to a terminal apparatus, the process comprising:
   authenticating the terminal apparatus using predetermined authentication information;
   determining whether a predetermined specific state, in which a normal connection between the computer and the terminal apparatus is not established, has occurred with the terminal apparatus; and controlling data communication with the terminal apparatus using a result of the authenticating and a result of the determining.

9. A terminal management apparatus comprising:
at least one processor configured to implement:
- a connection unit configured to connect, through a network, to a terminal apparatus to be managed;
- an authentication unit configured to authenticate the terminal apparatus using predetermined authentication information;
- a specific state determination unit configured to determine whether a predetermined specific state, in which a normal connection between the terminal management apparatus and the terminal apparatus is not established, has occurred in relation to the terminal apparatus; and
- a connection controller configured to control data communication with the terminal apparatus using a result obtained by the authentication unit and a result obtained by the specific state determination unit.

* * * * *